Feb. 6, 1945.  P. W. MILBURN ET AL  2,368,862
SHIPPING STRUCTURE
Filed Nov. 14, 1942   2 Sheets—Sheet 2

Paul W. Milburn
William D. Adamson
INVENTORS

BY *Edwin Coates*
ATTORNEY

Patented Feb. 6, 1945

2,368,862

UNITED STATES PATENT OFFICE 2,368,862

SHIPPING STRUCTURE

Paul W. Milburn, Los Angeles, and William D. Adamson, West Los Angeles, Calif., assignors to Douglas Aircraft Company, Inc., Santa Monica, Calif.

Application November 14, 1942, Serial No. 465,830

4 Claims. (Cl. 211—60)

This invention relates to a device for transporting articles such as airplane wings and other airplane parts, which are of light weight and large size, and which are readily damaged by impact with surrounding objects, and particularly to a device for transporting articles of this character without the use of protecting boxing or crating.

It is common practice in the airplane industry as in other industries, to fabricate some of the different parts of the completed product at separately located factories and ship them to a central plant for assembly. In shipping airplane parts, and particularly the wing panels, difficulties have been experienced in loading the parts in a manner such that they will be properly protected from damage in transit. Wing structures are of large size relative to their weight and are made of material which is readily dented or otherwise damaged upon contact with surrounding objects. The standard method of transporting wing structures has been within enclosing boxes or crates. One objection to this method is the relatively large volume of car space occupied per article shipped and another objection is the difficulty of so securing the wing panels within the box that they will not become loosened in transit and be damaged by contact with the box walls and the securing devices within the box.

One object of this invention is to provide a device for transporting articles of the general character above set forth without the use of boxing or crating, which shall protect the transported article from injury or damage.

Another object of the invention is to provide a means for transporting articles of the character described without boxing or crating, by which the article will be held immovable with respect to the transporting vehicle and out of contact with any part of the vehicle or with any other object.

It is another object of the invention to provide a device for transporting articles of the character described which will be economical of shipping space and will lend itself to the loading of a maximum number of articles in a transporting vehicle.

It is another object of the invention to provide an arrangement of shipping structures and car floor trackage for ready loading of the structures without sideswiping and through end doors of restricted opening.

It is another object of the invention to provide a device for loading, transporting and unloading articles of the character described without the use of enclosing protective boxing or crating.

Figure 1:
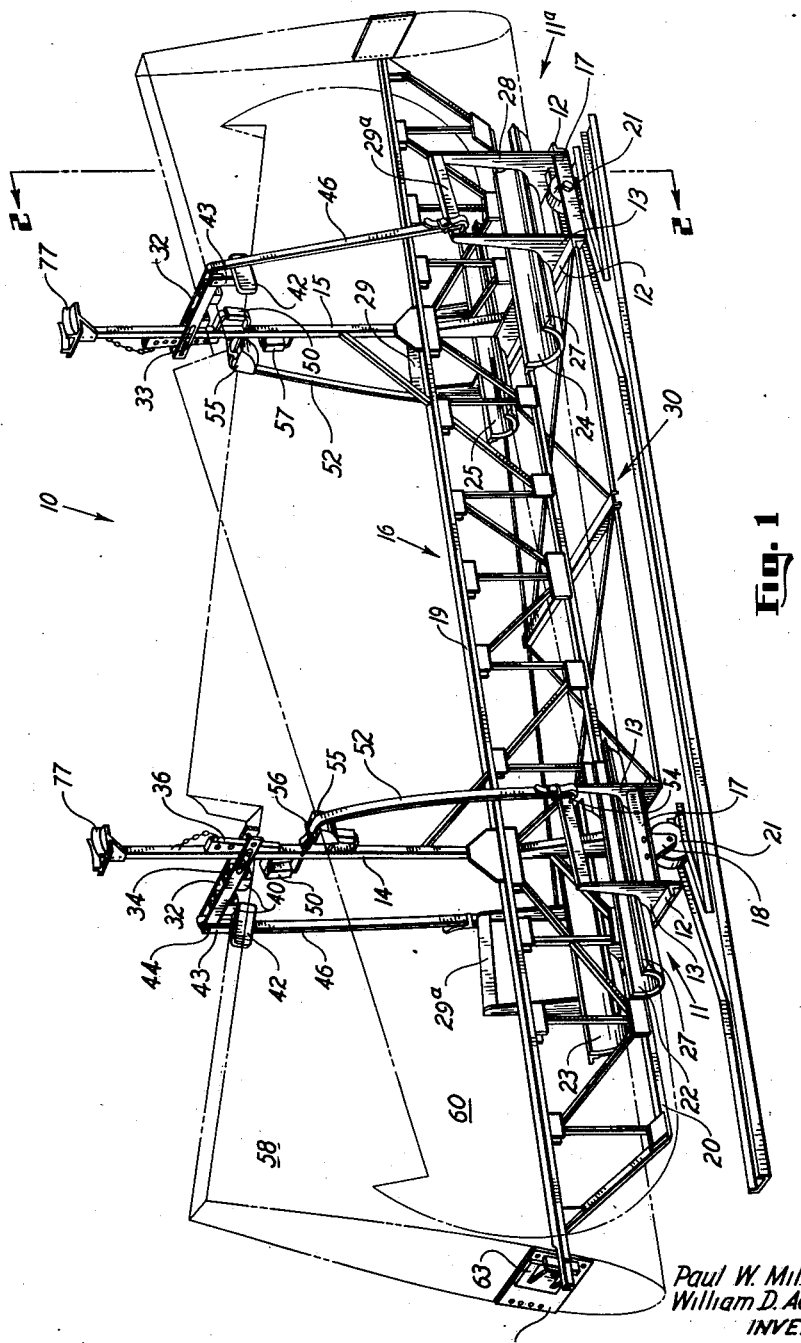
Figure 1 is a perspective view of a shipping structure embodying the invention showing in phantom lines two wing panels loaded thereon.
Figure 2:
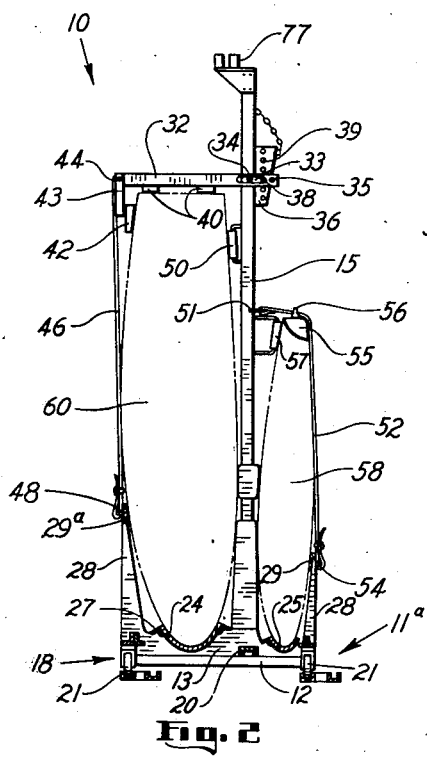
Figure 2 is a sectional view taken as indicated by the line 2—2 of Figure 1.
Figure 3:
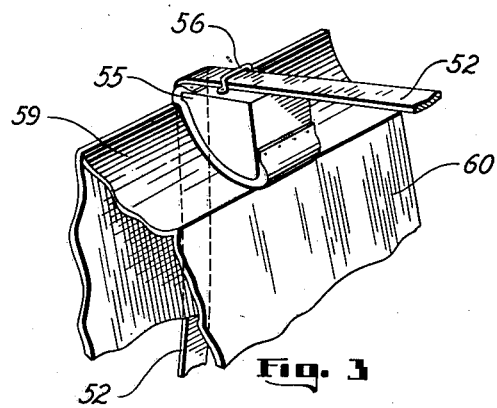
Figures 3 and 4 are fragmentary perspective views showing details of the structure.
Figure 4:
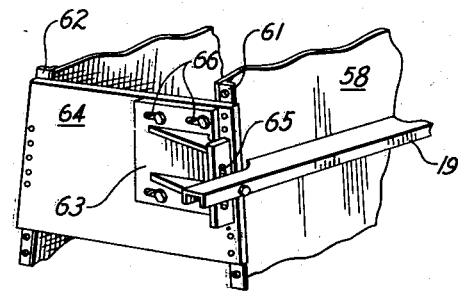

In Figures 1 and 2 of the drawings, a shipping structure 10 is shown loaded with a right outboard wing panel 60 and a left outboard wing panel 58.

The frame structure of the device comprises a pair of wheel supported cross frames 11 and 11a, a pair of standards 14 and 15 secured in upright position to the cross frames 11 and 11a respectively and a longitudinal frame member 16 connecting the standard 14 and cross frame 11 with the standard 15 and cross frame 11a in longitudinally spaced relation. A horizontally trussed frame 30 secured to the longitudinal frame member 16 and the cross frames 11 and 11a stiffens the member 16 against buckling stresses and holds the cross frames in parallel relation.

Each cross frame has a pair of transverse angle irons 12, and a pair of plates 13 secured thereto and connected at their ends by bars 17. A wheel carrying assembly 18 at each end of each cross frame mounts a wheel 21, these wheels providing a rolling support for the shipping structure.

The longitudinal frame 16 has a top channel bar 19 and a bottom channel bar 20 joined by vertical trussing comprising channels and gussets as shown.

To accommodate the tapering thickness of the panels between upper and lower surfaces, the longitudinal member 16 and the standards 14 and 15 are secured to the cross frames 11 and 11a at stations along the latter oppositely displaced from the longitudinal central plane of the shipping structure, the longitudinal member 16 crossing this central plane midway between the cross frames. The longitudinal frame member 16 projects at its ends a substantial distance beyond the cross frames 11 and 11a, its total length approximating that of the wing panels and its ends registering with the panel ends. The weight of the shipping structure and panels loaded thereon is thereby balanced on the two cross frames with the purpose of minimizing compressive, tensile and flexing stresses in the structure and panels.

The frame structure comprising the several elements above described is provided with devices for supporting and firmly holding in position, leading edge downward, a right wing panel 60 and a left wing panel 58, one on each side of the standards and longitudinal member 16. The cross frame 11 supports four angle iron sections 27 to two of which are secured a small padded saddle 22 at the shorter end of the cross frame and to the other two of which are secured a large padded saddle 23 at the longer end of the cross frame for receiving the leading edges of the outboard end portion of panel 60 and the inboard end portion of panel 58 respectively. Symmetrically related saddles 24 and 25 support the other ends of these panels on the cross frame 11a.

The lower portions of the panels are laterally supported by the rails 29 and 29a which bridge the outer upper extensions 28 of the plates 13.

The upper portions of the inboard ends of the panels are each laterally supported by a padded bar 42 carried by a depending bar 43 secured at its upper end to a horizontal double strap clamping arm 32. The arm 32 is secured to its corresponding standard 14 or 15 in a manner to permit its adjustment transversely of the shipping structure so that the padded bar 42 may be caused to press the wing panel firmly against a padded lug 50 mounted on the side of the standard.

The inner ends of the two straps of the clamping arm are horizontally slotted at 33 and supported on the standard by a pin 34 which is anchored in the standard and projects from both sides of the standard into the slots 33. The arm 32 is drawn toward the standard by a wedge 36, the inclined face of which engages a pin 35 fastened between the ends of the straps of the arm 32. The wedge is held against accidental upward movement by a removable key pin 38 which is passed through the slots 33 and any one of the adjustment holes 39.

To prevent upward movement of the wing panel 40 from the two saddles upon which it rests, in response to the jars and vibrations of the transporting vehicle, the arm 32 is provided with padded lugs 40 on its under side for engagement with the exposed trailing face of the frame structure of the inboard end of the rear section of the wing panel. The lugs 40 are held tightly against the wing panel by a strap 46 of webbing which is looped at its upper end about a pin 44 between the two metal straps of the arm 32 and which passes down alongside the wing panel and around a fastening loop 48 on the rail 29a. The strap 46 is provided at its lower end with the usual buckle for tightening the strap to pull the lugs 40 tightly down against the wing panel.

The outboard ends of the wing panels are similarly held down against their supporting saddles by a strap 52 which is secured at its upper end to a loop 51 on the standard, is threaded through a strap loop 56 on a form block 55, passes around the form block and down to a strap loop 54 on the rail 29. The form block is in the form of a quarter cylinder to conform to the aileron well 59 in the trailing edge of the outboard end portion of the wing panel. The strap 52 applies a downwardly and inwardly directed pressure to the wing panel, holding it down against its saddle and inwardly against a padded block 57 on the standard.

Each wing panel is held against longitudinal movement with respect to the shipping structure by a plate 64 secured to the flange angles 61 and 62 of the wing panel structure and a bracket fitting 63 bolted to the plate 64 and to the extreme tip end of the top channel 19 of the longitudinal frame member 16. A vertical bolt slot 65 and horizontal bolt slots 66 in the fitting 63 provide for vertical and horizontal adapting movement of the bracket in bolting it in position.

The structure is fixed laterally in loaded position in the car by engagement of the wheels with track rails secured to the car floor and by engagement of the grooved guides 77 at the tops of the standards 14 and 15 with a fixture (not shown) depending from the car roof. The structure may be fixed longitudinally of the car by strut bars (not shown) securable between the member 16 and the car ends or by removable stop lugs (not shown) securable to the track rails in position against the wheels to prevent rolling of the structure on the rails.

Figure 5:
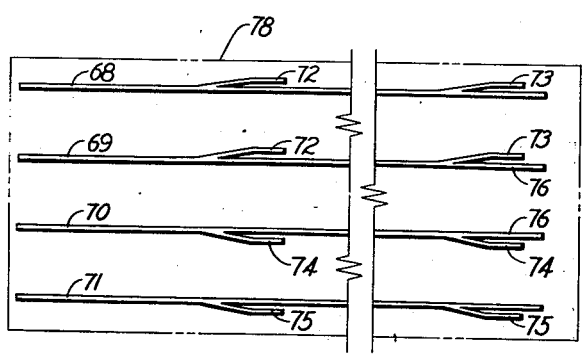
Figure 5 is a plan view of the box car trackage for loading and positioning three of the shipping structures.

If a shipping structure is of an overall width including the wing panels or other articles loaded thereon such that three loaded structures placed lengthwise in the car and in transverse alignment, occupy substantially the entire space between the side walls of the car, affording small clearance between adjacent structures and between the car wall and a proximate structure, it becomes difficult to so arrange the track rails that the three structures can be moved into the car without sideswiping each other and the car sidewalls and without fouling against the car door radii. To overcome this difficulty instead of six track rails, four uniformly gauged rails with short switch spurs are used as shown in Figure 5.

The two lefthand track rails 68 and 69 each have a pair of switch spurs 72 and 73, the spurs 72 being longitudinally spaced to conform to the longitudinal spacing of front and rear wheels on a shipping structure. The two right hand track rails 70 and 71 have oppositely disposed pairs of switch spurs 74 and 75. The extreme inner end portions 76 of the rectilinear stretch of the middle two track rails 69 and 70 are extended in lateral alignment with the spurs 73 and 74.

In loading, a shipping structure is rolled into the open end of a car on tracks 68 and 69 and onto spurs 72 and 73 as it approaches its home position in the car, the spurs shifting the structure over close to the car wall 78 leaving a clearance sufficient for shipment. This clearance would not however be a safely adequate clearance for such a relative movement of structure and wall as would be the case if the structure were moved into place on tracks spaced to afford only that small clearance while the structure is rolling into the car. Then a second shipping structure is rolled on tracks 70 and 71 to and onto spurs 74 and 75. A third structure is then rolled into the car on tracks 69 and 70 and stopped in lateral alignment with the other structures.

The trackage layout described above affords several additional advantages. It makes possible the ready loading of three structures closely filling the car from side to side through an end car doorway which is too small for three structures to stand therein side by side but large enough for admitting three structures in succession on a trackage layout of the kind described. It reduces the trackage weight nearly fifty per cent and it establishes a permanent, accurate gauging of the clearance space between the structures. This clearance would otherwise be dependent upon the care and workmanship exercised in spacing the tracks when they are secured to the car floor.

When the structures are in place, the grooved guides 77 are in lateral engagement with whatever ceiling fixtures are provided in the car for that purpose.

We claim:

1. In a shipping structure for airplane wing panels, the combination of: a pair of cross bottom frames longitudinally spaced on said shipping structure; a standard carried by each of said frames at a station there-across displaced from the center line of the structure, the two standards being oppositely displaced; an elongated horizontally disposed, vertically trussed, laterally thin, frame structure connecting the lower ends of said standards and lying in the vertical plane thereof, said frame structure projecting at each end a substantial distance beyond the corresponding standard; means carried by each cross frame on each side thereof for vertically supporting and laterally retaining a pair of similar airplane wing panels on opposite sides of said standards respectively, positioned with their leading edges downward and their inboard ends oppositely directed and with each inboard end juxtaposed to one of the outwardly facing sides of the corresponding adjacent standard; and means carried by each standard on each side thereof for laterally retaining said wing panels in said position.

2. The combination defined in claim 1, and in addition thereto; a transverse member secured to each outer end of said frame structure for having rigidly secured thereto the adjacent inboard end of the structure of the corresponding wing panel, said transverse members extending from the corresponding standards in opposite directions.

3. In a shipping structure for airplane wing panels, the combination of: a pair of cross bottom frames longitudinally spaced on said shipping structure; a standard carried by each of said frames at a station intermediate the ends thereof; an elongated horizontally disposed, vertically trussed, laterally thin, frame structure connecting said standards and lying in the vertical plane thereof, said frame structure projecting at each end a substantial distance beyond the corresponding standard; four padded saddles on said cross frames one on each side of each of said standards, said saddles being at a common level and shaped and disposed for supporting a pair of similar airplane wing panels on opposite sides of said standards respectively positioned with their leading edges downward and their inboard ends oppositely directed; longitudinally extended horizontal padded outer lateral supports for said panels carried by each end of each cross frame at a level above the level of said saddles; a first strap of adjustable length for the outboard end portion of each of said panels, each said strap being secured at one end to a standard at the level of the position of the adjacent panel trailing edge and passing around the outer side of said panel and releasably secured at the other end to one of said lateral supports; a longitudinally adjustable transverse bar on each standard over the position of the inboard end portion of a panel; and a second strap of adjustable length secured to the outer end of each said bars and passing downward around the panel and releasably secured at its lower end to one of said lateral supports.

4. The combination defined in claim 3 in which said bars are each provided with a padded lug on its under side for vertical pressural engagement with the wing panel therebeneath, and said first straps are each provided with a padded block adjustable therealong and shaped to conform to the trailing edge of the wing panel secured by said strap.

PAUL W. MILBURN.
WILLIAM D. ADAMSON.